United States Patent [19]

Wallace et al.

[11] Patent Number: 4,744,782

[45] Date of Patent: May 17, 1988

[54] CENTRIFUGAL COUPLINGS

[75] Inventors: Neil M. Wallace, Stockport; John P. Harrington, Whitefield, both of United Kingdom

[73] Assignee: Flexibox Ltd., Manchester, England

[21] Appl. No.: 925,092

[22] PCT Filed: Jan. 31, 1986

[86] PCT No.: PCT/GB86/00057

§ 371 Date: Oct. 6, 1986

§ 102(e) Date: Oct. 6, 1986

[87] PCT Pub. No.: WO86/04653

PCT Pub. Date: Aug. 14, 1986

[30] Foreign Application Priority Data

Feb. 5, 1985 [GB] United Kingdom ............... 8502838

[51] Int. Cl.$^4$ .............................................. F16D 3/60
[52] U.S. Cl. ..................................... 464/69; 464/160
[58] Field of Search ................. 464/69, 71, 137, 138, 464/160

[56] References Cited

U.S. PATENT DOCUMENTS

| | | | |
|---|---|---|---|
| 2,653,457 | 9/1953 | Guernsey et al. | 464/69 |
| 2,837,901 | 6/1958 | Chapman | 464/69 |
| 3,246,485 | 4/1966 | Chapman | 464/71 |
| 4,019,346 | 4/1977 | Fukuda | 464/69 X |
| 4,031,714 | 6/1977 | Faust | 464/69 |

FOREIGN PATENT DOCUMENTS

| | | |
|---|---|---|
| 34440 | 8/1981 | European Pat. Off. . |
| 95264 | 11/1983 | European Pat. Off. . |
| 2503586 | 7/1976 | Fed. Rep. of Germany ........ 464/69 |
| 1561613 | 3/1969 | France . |

*Primary Examiner*—Daniel P. Stodola
*Attorney, Agent, or Firm*—Woodard, Emhardt, Naughton, Moriarty & McNett

[57] ABSTRACT

A coupling has input and output members interconnected by two-link coupling elements which are flexible in the plane of rotation by centrifugal force acting on them as the coupling rotates and by the torque transmitted. The coupling is soft over a range of speeds and torques.

The input member is constructed from two metal spinnings welded together to form a housing which supports the pivot of each coupling element at both ends. The output member is similarly constructed with bushes welded on to support the pivot also at both ends. The pivots are axially free within limits increasing the axial misalignment capability of the coupling. A spring arrangement to buffer the links if they rapidly approach their stops is provided.

39 Claims, 5 Drawing Sheets

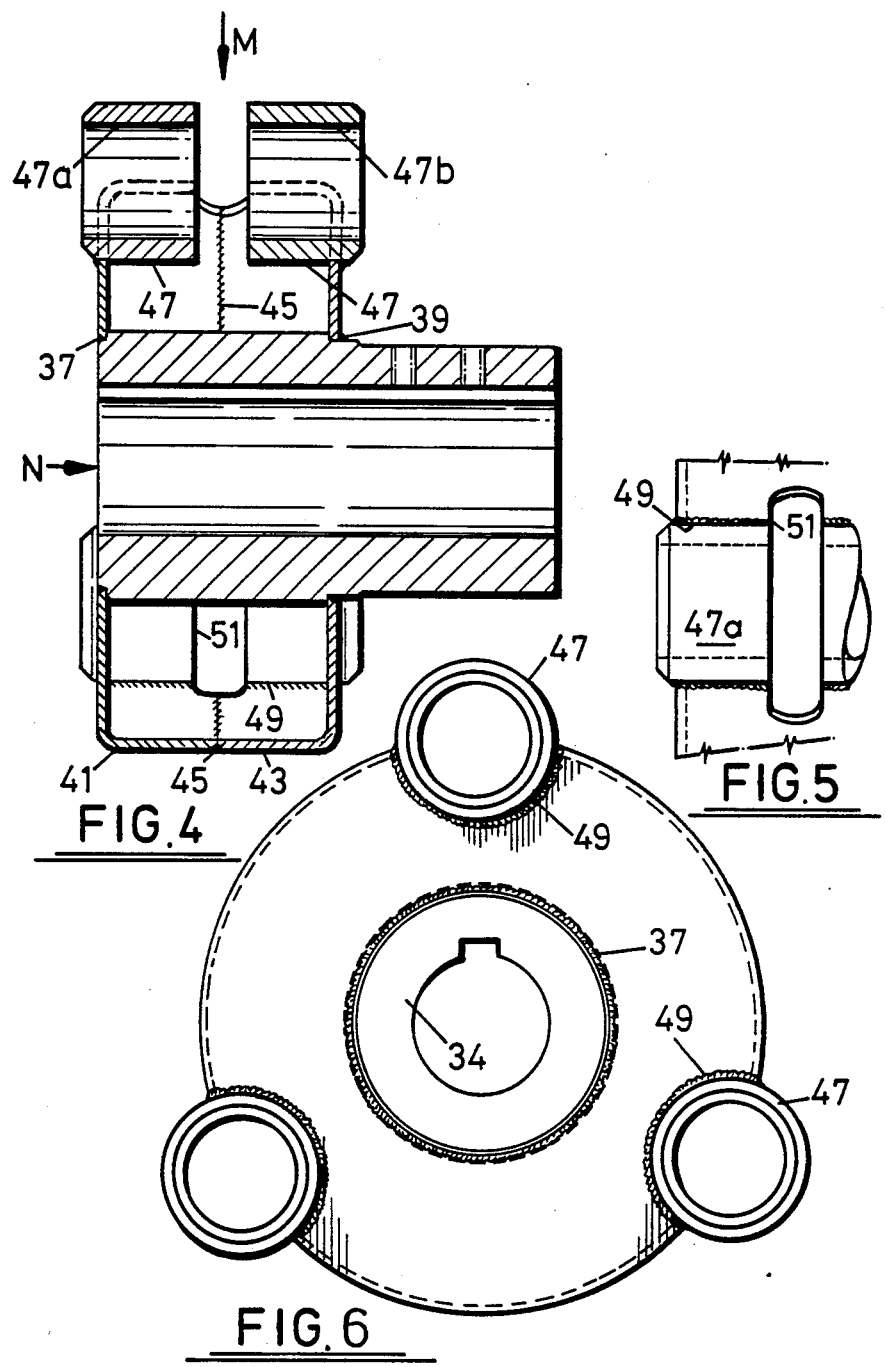

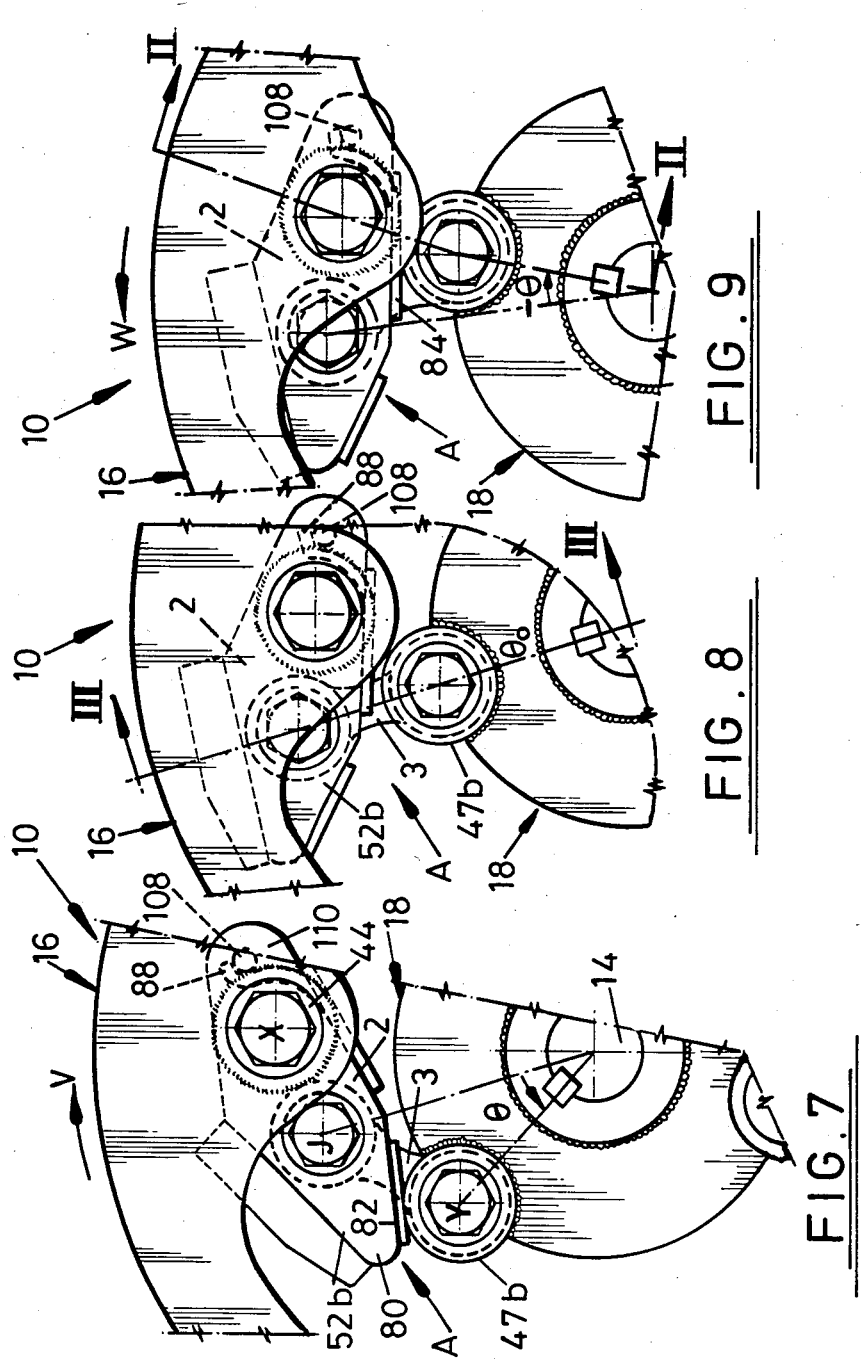

CENTRIFUGAL COUPLINGS

TECHNICAL FIELD

This invention relates to torsionally soft couplings of the type comprising input and output members respectively connectible to driving and driven shafts and interconnected by coupling elements which are flexible in the plane of rotation by torque transmitted by the coupling and by centrifugal force acting on the coupling elements such that the two members are relatively rotatable.

Such a coupling is relatively soft over a range of speeds and torques so that vibrations and fluctuations in torque on one side of the coupling are not transmitted to the other side.

BACKGROUND ART

European published application No. 34440 describes such a coupling where the coupling elements each comprise two pivoted links carried on cantilevered pins secured in the rigid flanges of the input and output members. A similar tandem arrangement is disclosed in European published application No. 95264. To be sufficiently rigid and strong such an arrangement is found in practice to be very heavy and the flanges account for about 80% of the weight of the coupling.

It is therefore an object of this invention to provide a coupling which is relatively light by comparison with the art but not any weaker or less capable in terms of torque, speed and stiffness characteristics.

SUMMARY OF THE INVENTION

A centrifugal coupling comprises:

(i) an input member connectible to a driving shaft;

(ii) an output member connectible to a driven shaft; and, (iii) coupling elements interconnecting said input and output members and being flexible in the plane of rotation of the coupling such that said input and output members are relatively rotatable, and in a first aspect of the invention is characterised in that one member comprises: a disc which is secured to one shaft and a ring which is axially spaced from the disc, is concentric therewith, and is connected thereto by a substantially cylindrical section, and in that pins, about which said coupling elements are arranged to pivot between the disc and ring, are supported in both the disc and ring such that radial loads imposed by the pins are shared substantially equally between the disc and ring.

The disc, cylindrical section and ring may be constructed from two substantially L-shaped section sheet-metal spinnings welded together to give a substantially U- or J- shaped section which is substantially tire-shaped.

This arrangement is much stronger than a simple flange with cantilevered pins. Firstly the pins are supported at both ends and thus are not subject to such high bending loads which can lead to distortion of any bearings on which the coupling elements may be mounted. Secondly the local moment on the flange in the region of and due to the cantilevered pin is removed, or at least substantially so and the only stresses which the flange, that is, the disc, must withstand are torsional in the plane of rotation of the coupling. It is for these reasons that the thick heavy flange used hitherto can be replaced by a sheet metal pressing or spinning.

In a second aspect of the invention the coupling is characterised in that the other member comprises:

(i) a hub for connection to the shaft;

(ii) two cup-shaped sheet metal spinnings each with a central aperture in its base of diameter equal to the diameter of the hub and welded open end to open end to each other and to the hub around the aperture; and, (iii) bushes set and welded in axially oriented slots in, and equally distributed about, the spinnings, through which bushes the coupling elements are connected to said other member.

Each bush may comprise two half-bushes set coaxially in said axially oriented slots and between which may be formed axially perpendicular chordal slots in the spinnings, each coupling element being carried between said half-bushes on a pin supported in both half-bushes.

The hub preferably has a portion having an outside diameter larger than said apertures and each metal spinning is thus fitted onto the hub at either end of said portion before being welded together at its ends.

Such an arrangement of said other member is particularly convenient for use with said one member although is not restricted thereto and it could be employed on its own with a conventional member if desired.

In a third aspect of the invention each coupling element is pivoted in at least one member through a pin which is supported at either end thereof and preferably each coupling element is secured to its respective pin and each pin is axially free in its supports in the member to a limit determined by the axial gap between said supports and by the thickness of the coupling elements between said supports.

Although preferable this arrangement can be employed on flexible couplings of the type to which this invention relates but not necessarily with those on which one or indeed both of the particular members defined above are present.

It is also preferred that each coupling element comprises two links pivoted together and at their other ends to the input and output members respectively.

In a fourth aspect of the invention the coupling is characterised in that the links are attached to each member at a different radius, in that stops are provided at two limits of link movement, in that one link rotates about its pivot to its member in the same direction whichever of said limits it is approaching and in that a buffer is provided in the form of a spring around said pivot which is engaged by said link as it approaches either limit.

Preferably said one link is pivoted between said disc and ring referred to above on a pin supported in bosses disposed in said disc and ring and said spring is disposed on one of said bosses which has a slot or lug for engagement with one end of the spring, the other end of the spring being adapted to engage another slot or lug on the link. Nevertheless this fourth aspect of the invention is not limited to its application in a coupling exhibiting the first, second and/or third aspects of the invention defined above although a coupling exhibiting all four aspects is especially useful.

Preferably one link is solid and has a forked end between which the other link is pivoted, said other link being flexible in planes other than in the plane of rotation. Where such is the case said other link may be a laminate of sheet-steel held together at its ends by a bush which is a press-fit in holes in the ends of the laminates and in a washer, the bush and washer clamping the laminates together in a bush/laminate/washer unit. Said pins mounting said other link at either end each advantageously comprises a bolt passing through a first bearing sleeve, said bush/laminate/washer unit and a second bearing sleeve and a nut which is used to clamp the whole into a pin assembly. Then said other link maybe mounted between said half-bushes on said other member at one end and between said forked end of said one link at the other end. Preferably said other member is the output member.

BRIEF DESCRIPTION OF THE DRAWINGS

All the aspects of the invention are further described hereinafter with reference to the accompanying drawings in which:

FIG. 4 is a section through the output member of the coupling of FIG. 1;

FIG. 5 is a part plan view of the member shown in FIG. 4 looking in the direction of the arrow M;

FIG. 6 is an end view of the member shown in FIG. 4 looking in the direction of the arrow N; and FIGS. 7 to 9 are end views of part of the coupling of FIG. 1 showing one coupling element in three rotational positions looking in the direction of the arrow P in FIGS. 1, 2, and 3 and with the cover plate removed.

DETAILED DESCRIPTION OF THE INVENTION

Figure 1:
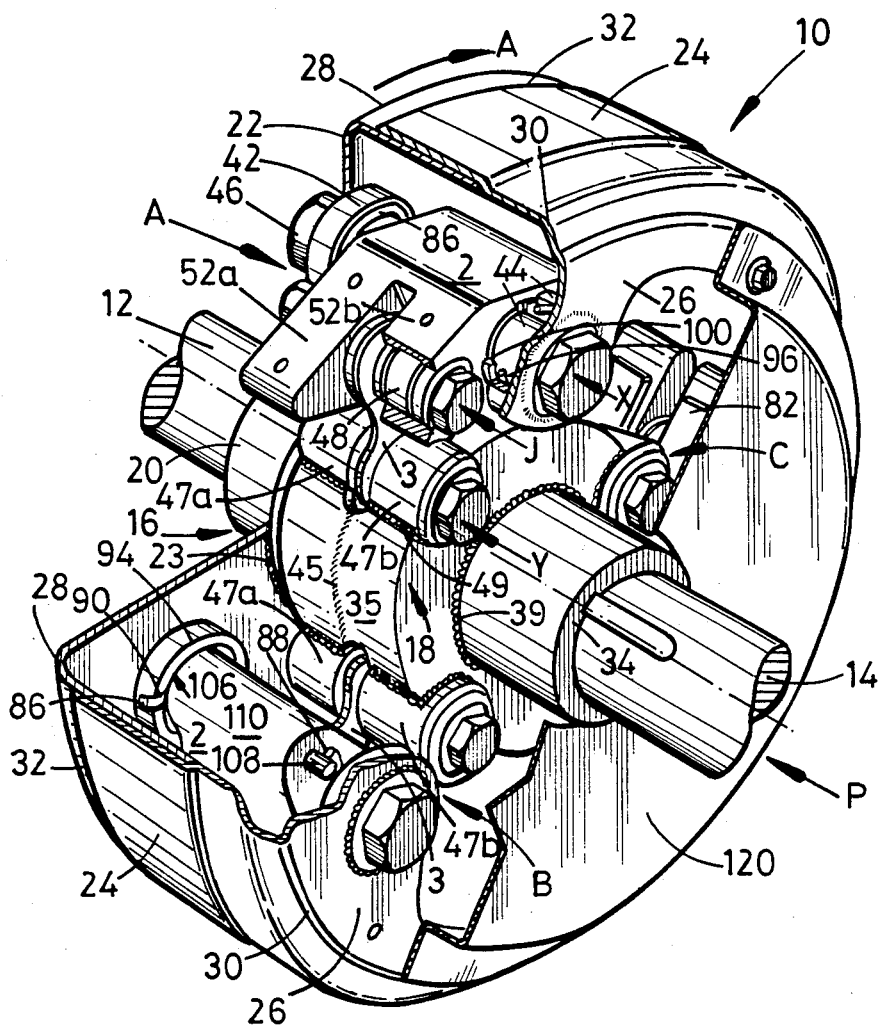
FIG. 1 is a cutaway perspective view of a coupling according to the present invention.
Figure 2:
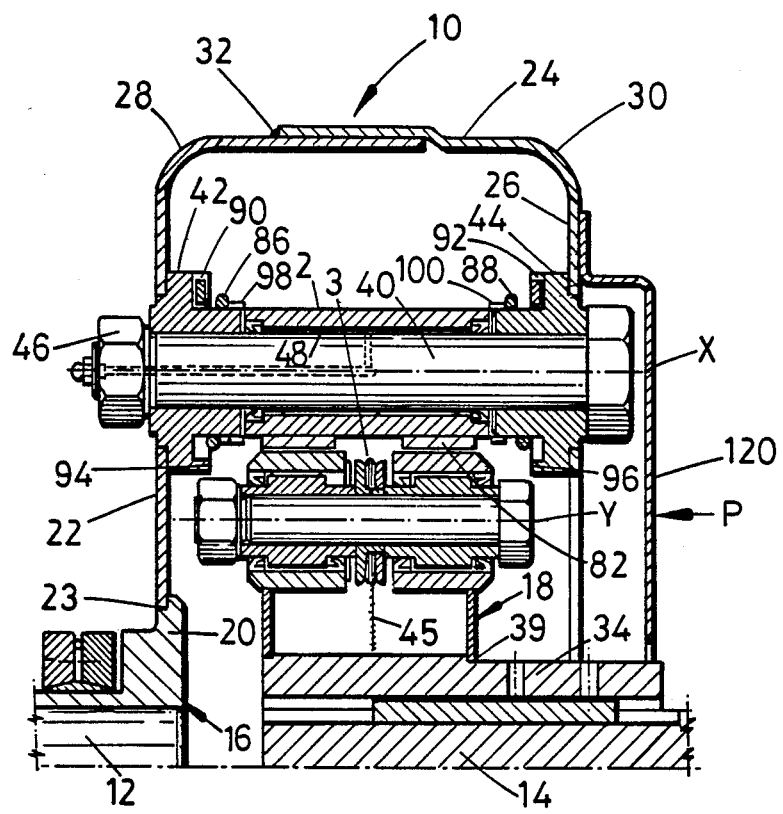
FIG. 2 is a section through the coupling of FIG. 1 on a plane intersecting the attachments of one coupling element to each member, along the line II—II in FIG. 9.
Figure 3:
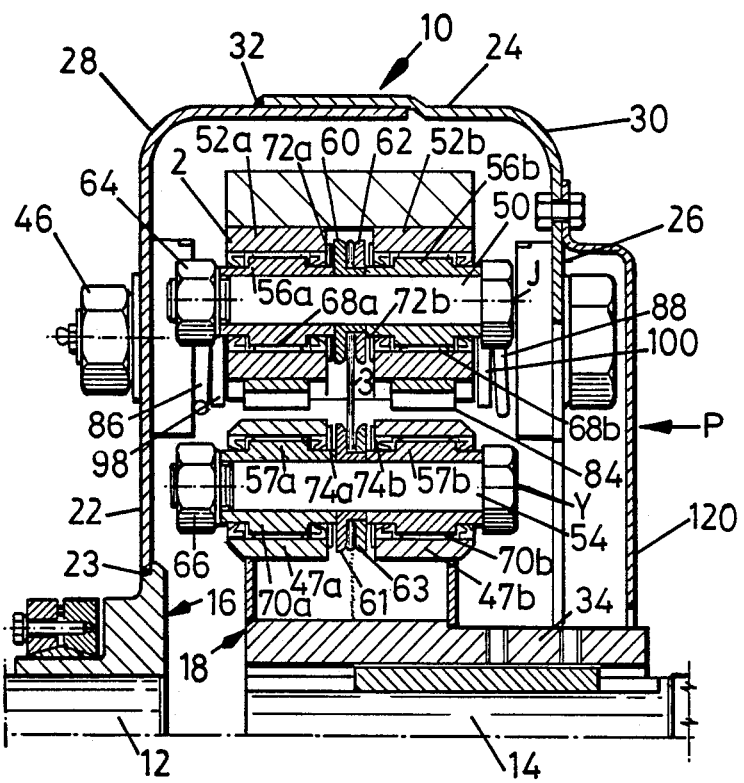
FIG. 3 is a section similar to FIG. 2 along the line III—III in FIG. 8.

In the drawings and particularly FIGS. 1,2, and 3, a coupling 10 connects a driving shaft 12 with a driven shaft 14. The coupling 10 comprises an input member 16 and an output member 18 connected to the driving and driven shafts respectively. The input member 16 comprises a hub 20, a radial flange or disc 22 welded to the hub along a peripheral line 23, a cylindrical section 24 at the periphery of the disc and a radial extension or ring 26; the disc 22, section 24 and ring 26 are formed from two sheet metal spinnings 28,30 welded together along a circumferential line 32 around the coupling. This gives overall an essentially tire-shaped housing.

The output member 18 comprises a hub 34 and an essentially tire-shaped flange 35 (see also FIGS. 4, 5 and 6) welded to the hub 34 along its internal edges or apertures 37,39. The flange 35 is formed from two cup shaped metal spinnings 41,43 welded along their top edges 45.

The flange 35 carries bushes 47 which are welded into axial slots 49 cut into the flange at points equally spaced about its circumference. Chordal slots 51 are also cut at right angles to the slots 49. Each bush 47 is formed from two half-bushes 47a,b separated by a distance equal to the width of the slots 51.

Between the input and output members 16,18 there are connected three coupling elements A,B,C each comprising two links 2,3 pivoted to each other at J and to the input and output members respectively at X and Y, (see FIG. 7 for instance).

Referring to FIG. 2, the X pivot comprises a pin 40 which passes through two bosses 42, 44 welded in the radial flange or disc 22 and radial extension or ring 26 respectively. A nut 46 secures the pin 40 in the bosses 42,44. Around the pin 40 and between the bosses 42,44 the link 2 is supported on plain or needle roller bearings 48. The nut 46 tightens onto a shoulder on the pin 40 preventing the link 2 from being clamped between the bosses 42,44.

Referring to FIG. 3, the J pivot comprises a pin 50 which passes through two extensions 52a,b forming a toe 80 of the link 2. The Y pivot likewise comprises a pin 54 wich passes through the two half-bushes 47a,b on the output member 18 described above with reference to FIGS. 4 to 6. On each pin 50,54 there is mounted two sleeves 56a,b and 57a,b respectively, between which and around each pin 50,54 there is captivated either end of the link 3. The link 3 comprises a laminate of sheet steel which is held together at either end by a bush 60,61 and washer 62,63 respectively. The bushes 60,61 are a press fit in the laminate and washers 62,63 and are a close fit, together with the sleeves 56a,b and 57a,b on the respective pins 50,54. Nuts 64,66 securely clamp the sleeves, bushes, laminates and washers onto the respective pins 50,54.

Each sleeve is mounted in a plain bearing 68a,b and 70a,b in the two extensions 52a,b and two half-bushes 47a,b respectively.

The coupling exhibits a degree of angular or axial misalignment capability by virtue of the flexibility of the link 3 in planes other than the plane of rotation. Hitherto, however, such flexibility has always been accompanied by a reaction from the link 3 with a resultant increase in the wear on the bearings. However, in FIG. 3 each pin assembly at the ends of the link 3 has a degree of axial freedom in the bearings 68a,b and 70a,b. The axial freedom is limited by the separation between the washer/laminate/bush units and thrust washers 72a,b and 74a,b disposed on either side of said units and abutting the inside surfaces of extensions 52a,b and half-bushes 47a,b respectively. Thus should there occur any axial misalignment between the shafts 12 and 14 this can be accomodated by this freedom without any reaction at all. Should the misalignment go beyond the limits of the axial freedom or should there occur angular misalignment then the link 3 can flex to accomodate either misalignment as was already possible hitherto.

Turning now to FIGS. 7 to 9 these illustrate three rotational positions of one coupling element A of the coupling 10 as it might adopt in use. In FIG. 7 the coupling is in the startup position. The input member 16 is driven in the direction of the arrow V by the driving shaft (not shown).

As a result the links 2,3 straighten out until the toe 80 of the link 2 abuts the boss 47 through a pad 82 disposed on the toe 80. The output member 18 and driven shaft 14 are then constrained to rotate with the input member 16. As the speed of rotation increases centrifugal force is exerted on the links 2,3 tending to throw them out from the centre of the coupling. Torque between the driving and driven shafts however tends to keep them straight. Assuming the coupling is correct for the application, then, as the speed increases, the links move towards the position illustrated in FIG. 8 where the link 3 is radial. In this position no torque can be transmitted by the link 3 to the output member 18 and as a consequence this position is termed the no-torque or zero-deflection position.

In this position either member 16,18 can rotate relative to the other without transmitting that movement to the other. Should one shaft have torsional vibration in it therefore that vibration will not be transmitted across the coupling. That is to say, the coupling has zero stiffness.

In FIG. 7 however the coupling is in its maximum-torque or maximum defection position where θ is the angle of deflection and, depending on coupling design, is usually arranged to be about 25 degrees. Here the links 2,3 are rigid and the coupling is infinitely stiff. At both extremes the coupling is not very useful in that in FIG. 7 it is rigid and in FIG. 8 it is transmitting no torque. In both cases the ratio of the stiffness of the coupling to the torque transmitted by the coupling, the S/T ratio, is high whereas this should be low in a useful coupling. However between the two extremes represented by FIGS. 7 and 8 the S/T ratio falls and over various ranges of speeds and torques is below that value at which the torque transmitted is reasonable but the vibration transmission is low.

In FIG. 9 the coupling is shown in the overrun position which it would adopt, perhaps only momentarily, if the load on the driven shaft 14 was suddenly removed and certainly if a brake was applied to the driving member 16 which in that instance effectively drives in the direction of the arrow W. The links lock in this overrun position when the boss 47 contacts a pad 84 on the link 2.

It should be noted that the link 2 is in its maximum clockwise orientation with respect to the X pivot when the link 3 is radial and so rotates anticlockwise from this position when approaching either limit shown in FIGS. 7 and 9. This fact is utilised in the provision of a buffer to retard the links should they violently approach either limit position. A spring 86,88 is wrapped around each boss 42,44 (see FIGS. 1 and 2 as well) and is rotationally locked in a slot 90,92 provided for this in a circumferential lip 94,96 of each boss. A ring 98,100 is press-fitted on the bosses 42,44 after the springs are fitted and serves to retain them in position. The free end 102,104 of each spring catches a lug 106,108 formed on either edge of a heel 110 of the link 2. In FIG. 8 the spring 88, and its partner 86 on the other side (not seen) of the link 2, are both free of the lugs 108,106 respectively. Thus there is no torque on the link 2. However as the coupling rotates in either direction towards the limits shown in FIGS. 7 and 9, the lugs 106,108 bend their respective springs 86,88 and counter the rotation of the link 2 towards those limits. This together with the pads 82,84 referred to above prevent the limits being reached at high speed and with such momentum and thus with less possibility of damage to the parts or significant wear thereof.

Returning once again to FIGS. 1,2 and 3 the input member 16 in the form of the radial flange or disc 22, cylindrical section 24 and radial extension or ring 26 and the mounting of the pin 40 in both the disc 22 and ring 26 means that the cantilever mounting of the pin as used hitherto for both or at least one of the pivots X,Y is now dispensed with entirely. The fact that the ring 26 inherently resists radially directed forces means that both ends of the pin 50 are radially supported and so local moments in the region of the attachment of the pin to the flange 22 are removed. This flange can then be constructed from much thinner and weaker material than was hitherto the case, since it now only needs to accomodate forces and moments which are in the plane of rotation, i.e. the plane in which it is advantageously set.

The arrangement has several other advantages as well in that the disc 22 section 24 and ring 26 form together an attractive housing for the coupling so that the appearance of the coupling is much neater. More importantly, if any link should snap or break and should hit the housing there is no high speed relative rotational movement between the parts which is the case where a stationery guard is employed. The housing provides of course a shroud to prevent any parts which do break off from being thrown out at high speed. Furthermore the windage of the coupling is considerably reduced and so noise and air resistance are cut down. A cover plate 120 is bolted to the radial extension 26 to complete the housing.

Finally the weight of the coupling is much reduced; a larger proportion of which is now taken by the coupling elements rather than the flanges as has hitherto always been the case.

Returning to FIGS. 4,5 and 6 the arrangement of the output member in the way described with reference to those drawings presents several advantages not only over a flange arrangement as described for instance in European published application No. 34440 with cantilevered pin supports but even over the much better solid hub having support for the Y pins at both their ends. The hub in the latter case is solid and has an intricate shape presenting significant casting difficulties. With the embodiment illustrated in FIGS. 4,5 and 6 a simple hub 34 can be cast and the sheet metal spinnings 41,43 can simply be welded to the hub. The bosses 47 can be welded into the slots cut for that purpose and are well supported as a result. The arrangement, as well as being considerably easier and cheaper to construct is also much lighter with little or no loss of strength.

Instead of sheet metal spinnings the disc, cylindrical section and ring of the input member and/or the cup-shaped metal spinnings of the output member may be pressings, fabricated or otherwise produced.

The connection between the disc, cylindrical section and ring and the connection between the cup-shaped metal elements may instead of being welded be bolted, rivetted or other convenient connections.

The buffer spring may be some other torsional connection, for example a metal/elastomer (rubber)/metal sandwich with one metal face pinned or otherwise connected to the disc of the input member (also the ring of the input member if two buffers are provided) and the other metal face pinned or otherwise connected to the link pivot.

We claim:
1. A centrifugal coupling comprising:
an input member connectible to a driving shaft;
an output member connectible to a driven shaft;
one of sid input and output members comprising two substantially L-shaped section sheet metal elements connected together to define a substantially U-shaped section, the substantially U-shaped section comprising a disc adapted to surround and to be connected to one shaft and extending radially of the latter, a ring axially spaced from the disc and also extending radially of said one shaft, and a cylindrical section connecting the disc and the ring radially outwardly of said one shaft; and,
coupling means including a coupling for interconnecting said input and output members for rotational movement and for being flexible in the plane of rotation of the coupling such that said input and output members are relatively rotatable, said coupling means including a plurality of coupling elements pivotally mounted to said one member;

said coupling means further including a pin on which a respective coupling element is pivoted, the pin having two ends, said coupling means also including support means comprising supports for supporting the pin at its ends between the disc and ring such that radial loads imposed by the pins are shared substantially between the disc and the ring and with each pin being axially free in its end supports in said one member to a predetermined degree.

2. A coupling as claimed in claim 1, characterized in that the two substantially L-shaped section sheet metal elements are spinnings welded together to give the substantially U-shaped section.

3. A coupling as claimed in claim 2, characterized in that the welded spinnings are substantially tire-shaped.

4. A coupling as claimed in claim 1, characterized in that said cylindrical section is disposed radially outside the connections of the pins to the disc and ring.

5. A coupling as claimed in claim 1, and said one member further including a hub, said disc being welded to the hub for connection to the respective shaft.

6. A coupling as claimed in claim 1, and in which the other member comprises:
a hub for connection to the respective shaft;
two cup-shaped sheet metal elements each with a central aperture in its base of diameter equal to the diameter of the hub and secured open end to open end to each other and to the hub around each aperture, the sheet metal elements having equally distributed, axially oriented slots; and,
bushes set and secured in the axially oriented slots in and equally distributed about the sheet metal elements through which bushes the coupling elements are connected to said other member.

7. A coupling as claimed in claim 6, characterized in that the two cup-shaped metal elements are metal spinnings welded together open end to open end, and in that the bushes are welded in the axially oriented slots of the spinnings.

8. A coupling as claimed in claim 7, characterized in that each bush comprises two half-bushes set coaxially in said axially oriented slots and between which is formed axially perpendicular chordal slots in the spinnings, each coupling element being carried between said half-bushes on a pin supported in both half-bushes.

9. A coupling as claimed in claim 7, characterized in that the hub has a portion having an outside diameter larger than said apertures and in that each metal spinning is fitted onto the hub at either end of said portion, before being welded together at its ends.

10. A coupling as claimed in claim 6, characterized in that said other member is the output member.

11. A coupling as claimed in claim 1, characterized in that each pin is axially free in its supports in the respective member to a limit determined by the axial gap between said supports and by the thickness of the coupling elements between said supports.

12. A coupling as claimed in claim 11, characterized in that said supports comprise half-bushes.

13. A coupling as claimed in claim 1, characterized in that each coupling element comprises two links pivotally connected together at one end and pivotally connected at their other ends to the input and output members respectively.

14. A coupling as claimed in claim 13, characterized in that the links are attached to each member at a different radius, in that stops are provided at two limits of link movement, in that one link rotates about its pivot to its member in the same direction whichever of said limits it is approaching and in that a buffer is provided at said pivot which is engaged by said link as it approaches either limit.

15. A coupling as claimed in claim 14, characterized in that the buffer is in the form of a spring around said pivot.

16. A coupling as claimed in claim 15, characterized in that said one link is pivoted between said disc and ring on a pin supported in bosses disposed in said disc and ring and in that said spring is disposed on one of said bosses which has a slot or lug for engagement with one end of the spring, the other end of the spring being adapted to engage another slot or lug on the link.

17. A coupling as claimed in claim 16, characterized in that a spring is disposed in each boss.

18. A coupling as claimed in claim 14, characterized in that the buffer is pinned to the disc of the first member and to said pivot.

19. A coupling as claimed in claim 14, characterized in that one link is solid and has a forked end between which the other link is pivoted, said other link being flexible in planes other than in the plane of rotation.

20. A coupling as claimed in claim 19, in which said other link is a laminate of sheet-steel held together at its ends by a bush which is a press-fit in holes in the ends of the laminates and in a washer, the bush and washer clamping the laminates together in a bush/laminate/washer unit.

21. A coupling as claimed in claim 20, in which said pins mounting said other link at either end each comprises a bolt passing through a first bearing sleeve, said bush/laminate/washer unit and a second bearing sleeve and a nut which is used to clamp the whole into a pin assembly.

22. A coupling as claimed in claim 20, characterized in that said other link is mounted between said half-bushes on said other member at one end and between said forked end of said one link at the other end.

23. A centrifugal coupling comprising:
an input member connectible to a driving shaft;
an output member connectible to a driven shaft;
one member comprising:
a disc which is securable to one shaft;
a ring which is axially spaced from the disc and is concentric therewith; and,
a substantially cylindrical section connecting the disc and the ring; and,
coupling means including a coupling for interconnecting said input and output members for rotational movement and for being flexible in the plane of rotation of the coupling such that said input and output members are relatively rotatable, said coupling means including a plurality of coupling elements pivotally mounted to said one member;
said one member further comprising pins supported in both the disc and ring such that radial loads imposed by the pins are shared substantially equally between the disc and ring, said coupling elements being arranged to pivot between the disc and ring about said pins;
each coupling element comprising two links pivotally connected together at one end and pivotally connected at their other ends to the input and output members respectively, the links being attached to each member at a different radius with stops provided at two limits of link movement, one link rotating about its pivot to its member in the same direction whichever of said limits it is approaching;

each coupling element further comprising a buffer in the form of a spring having two ends and provided around the pivot of the one link which is engaged by said one link as it approaches either limit;

each of said disc and ring including a boss, said coupling means further including a pin supported in said bosses, one link being pivoted on said pin, one of said bosses defining a slot or lug, said one link including a slot or lug, said spring being disposed on said boss having a slot or lug and said spring having one end engaged with the slot or lug of said boss, said spring having its other end engaged with the slot or lug on said link.

24. A coupling as claimed in claim 23, characterized in that said disc, cylindrical section and ring are constructed from two substantially L-shaped section sheet metal spinnings welded together to give a substantially U-shaped section.

25. A coupling as claimed in claim 24, characterized in that the welded spinnings are substantially tire-shaped.

26. A coupling as claimed in claim 23, characterized in that said cylindrical section is disposed radially outside the connections of the pins to the disc and ring.

27. A coupling as claimed in claim 23, and said one member further including a hub, said disc being welded to the hub for connection to the respective shaft.

28. A coupling as claimed in claim 23, and in which the other member comprises:

a hub for connection to the respective shaft;

two cup-shaped sheet metal elements each with a central aperture in its base of diameter equal to the diameter of the hub and secured open end to open end to each other and to the hub around each aperture, the sheet metal elements having equally distributed, axially oriented slots; and, bushes set and secured in the axially oriented slots in and equally distributed about the sheet metal elements through which bushes the coupling elements are connected to said other member.

29. A coupling as claimed in claim 28, characterized in that the two cup-shaped metal elements are metal spinnings welded together open end to open end, and in that the bushes are welded in the axially oriented slots of the spinnings.

30. A coupling as claimed in claim 29, characterized in that each bush comprises two half-bushes set coaxially in said axially oriented slots and between which is formed axially perpendicular chordal slots in the spinnings, each coupling element being carried between said half-bushes on a pin supported in both half-bushes.

31. A coupling as claimed in claim 29, characterized in that the hub has a portion having an outside diameter larger than said apertures and in that each metal spinning is fitted onto the hub at either end of said portion, before being welded together at its ends.

32. A coupling as claimed in claim 28, characterized in that said other member is the output member.

33. A coupling as claimed in claim 23, characterized in that said coupling means includes a pin on which the respective coupling element is pivoted, the pin having two ends, said coupling means including support means comprising supports for supporting the pin at its ends upon the respective member, each coupling element being pivoted on at least one pin supported by a member, each coupling element being secured to its respective pin and each pin being axially free in its supports in the member to a limit determined by the axial gap between said supports and by the thickness of the coupling elements between said supports.

34. A coupling as claimed in claim 33, characterized in that said supports comprise half-bushes.

35. A coupling as claimed in claim 23, characterized in that a spring is disposed in each boss.

36. A coupling as claimed in claim 23, characterized in that one link is solid and has a forked end between which the other link is pivoted, said other link being flexible in planes other than in the plane of rotation.

37. A coupling as claimed in claim 36, in which said other link is a laminate of sheet-steel held together at its ends by a bush which is a press-fit in holes in the ends of the laminates and in a washer, the bush and washer clamping the laminates together in a bush/laminate/washer unit.

38. A coupling as claimed in claim 37, in which said pins mounting said other link at either end each comprises a bolt passing through a first bearing sleeve, said bush/laminate/washer unit and a second bearing sleeve and a nut which is used to clamp the whole into a pin assembly.

39. A coupling as claimed in claim 37, characterized in that said other link is mounted between said half-bushes on said other member at one end and between said forked end of said one link at the other end.

* * * * *